United States Patent
Adi et al.

(10) Patent No.: US 11,709,538 B2
(45) Date of Patent: Jul. 25, 2023

(54) MINIMIZING POWER LOSS AND RESET TIME WITH MEDIA CONTROLLER SUSPEND

(71) Applicant: Micron Technology, Inc., Boise, ID (US)

(72) Inventors: Frederick Adi, Castro Valley, CA (US); Venkata Naga Lakshman Pasala, Milpitas, CA (US); Wei Wang, Dublin, CA (US); Jiangli Zhu, San Jose, CA (US); Paul Stonelake, Santa Clara, CA (US); Nagireddy Chodem, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 68 days.

(21) Appl. No.: 16/949,892

(22) Filed: Nov. 19, 2020

(65) Prior Publication Data
US 2022/0155840 A1     May 19, 2022

(51) Int. Cl.
| | | |
|---|---|---|
| *G06F 11/00* | (2006.01) | |
| *G06F 1/30* | (2006.01) | |
| *G06F 1/3234* | (2019.01) | |
| *G06F 11/07* | (2006.01) | |
| *G06F 11/30* | (2006.01) | |

(52) U.S. Cl.
CPC .............. *G06F 1/30* (2013.01); *G06F 1/3275* (2013.01); *G06F 11/0772* (2013.01); *G06F 11/3037* (2013.01); *G06F 11/3062* (2013.01)

(58) Field of Classification Search
CPC ............. G06F 11/0703; G06F 11/0727; G06F 11/073; G06F 11/0751; G06F 11/0772; G06F 11/1441; G06F 11/3037; G06F 11/3058; G06F 11/3062; G06F 1/30; G06F 1/3203; G06F 1/3275; G06F 2201/81
See application file for complete search history.

(56) References Cited

U.S. PATENT DOCUMENTS

| | | | |
|---|---|---|---|
| 2011/0058440 A1* | 3/2011 | Smith ................. | G06F 11/1441 365/229 |
| 2012/0167100 A1* | 6/2012 | Li .......................... | G11C 16/22 710/5 |
| 2015/0149735 A1* | 5/2015 | Nale .................... | G06F 13/1694 711/147 |

* cited by examiner

*Primary Examiner* — Anthony J Amoroso
(74) *Attorney, Agent, or Firm* — Lowenstein Sandler LLP (57) ABSTRACT

A processing device in a memory sub-system detects a preemptive power loss condition in the memory sub-system and, in response, causes operations of a local media controller associated with a memory device in the memory sub-system to be suspended, wherein responsive to being suspended, the local media controller to perform power loss handling operations to complete a subset of a plurality of pending memory access operations, and wherein to perform the power loss handling operations, the local media controller to complete the subset of the plurality of pending memory access operations for which an acknowledgment signal has been sent to a requestor. The processing device further detects a full power loss and restore condition in the memory sub-system, responsive to detecting the full power loss and restore condition, initializes the memory device and causes operations of the local media controller to resume.

14 Claims, 5 Drawing Sheets

MINIMIZING POWER LOSS AND RESET TIME WITH MEDIA CONTROLLER SUSPEND

TECHNICAL FIELD

Embodiments of the disclosure relate generally to memory sub-systems, and more specifically, relate to minimizing power loss and reset time with media controller suspend for a memory device in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Aspects of the present disclosure are directed to minimizing power loss and reset time with media controller suspend for a memory device in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that is a cross-point array of non-volatile memory that can perform bit storage based on a change of bulk resistance, in conjunction with a stackable cross-gridded data access array. Another example of a non-volatile memory device is a negative-and (NAND) memory device. Other examples of non-volatile memory devices are described below in conjunction with FIG. 1. Each of the memory device can include one or more arrays of memory cells. A memory cell ("cell") is an electronic circuit that stores information. Depending on the cell type, a cell can store one or more bits of binary information, and has various logic states that correlate to the number of bits being stored. The logic states can be represented by binary values, such as "0" and "1", or combinations of such values. For example, a single level cell (SLC) can store one bit of information and has two logic states. The memory sub-system includes a memory sub-system controller that can communicate with the memory devices to perform operations such as reading data, writing data, or erasing data at the memory devices and other such operations. A memory sub-system controller is described in greater below in conjunction with FIG. 1.

The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. The metadata and host data, together, is hereinafter referred to as "payload." Metadata, host data, and parity data, which is used for error correction, can collectively form an error correction code (ECC) codeword. Metadata can also include data version (e.g. used to distinguish age of data written), valid bitmap (which LBAs or logical transfer units contain valid data), etc.

A memory sub-system, like all electronic devices, is susceptible to loss of power from a primary power sources, such as an external power supply. In the event of a power loss, there can be pending memory access commands or requests that, if not completed, can result in the loss of host data. Thus, when there is a loss of power, certain memory sub-systems use a secondary power source, such as an array of capacitors, a battery, energy from a spinning disk, or the like, to permit the memory sub-system to perform a set of power loss operations. The set of power loss operations can be various operations that include, for example, writing data that should be preserved through the loss of power, such as data in transition between the host device and the memory device, data stored in volatile memory of the memory sub-system, or the like. In order to have enough energy to ensure that the set of power loss operations can be performed, conventional memory sub-systems are designed to overcompensate for holdup energy (i.e., energy that is used by the memory sub-system in the event of loss of power from the primary power source). The use of this secondary power source adds to the complexity and size of the memory sub-system. In addition, in response to a power loss event, certain conventional memory sub-systems block all new incoming memory access request from the host system while waiting for all of the outstanding memory access operations to be completed in a graceful way. This includes processing any memory access commands received before the loss of power, including memory access commands for which an acknowledgement has not yet been sent to the host system. Accordingly these power loss operations can take significant time to complete, which can at times exceed a holdup time of the memory sub-system (i.e., an amount of time for which the holdup energy allows for power loss operations).

Aspects of the present disclosure address the above and other deficiencies by minimizing power loss and reset time with media controller suspend for a memory device in a memory sub-system. In one embodiment, a power management component in the memory sub-system monitors a power supply level and determines when the power supply level satisfies a threshold criterion (e.g., falls below a threshold level). In one embodiment, the threshold level is set to indicate that the power supply level is dropping (and that a power loss is likely to occur soon) but is set at a level such that there is still adequate holdup energy before full power loss. This allows for sufficient holdup time for some power loss operations to be performed. Responsive to the threshold criterion being satisfied, an interrupt or other notification can be received, and the power management component, the memory sub-system controller, or some other component can cause a media controller to be suspended. The media controller can manage operations of a memory device, such as a 3D cross-point memory device, and can be physically located on a die with the memory device. In one embodiment, suspending the media controller causes the media controller to complete any memory access operations that have already been acknowledged to the host and to drop any other pending memory access operations. Since the media controller need only process this limited number of memory access operations, the media controller can complete these power loss operations in the time (i.e., the holdup time) before all power is lost in the memory sub-system.

Advantages of this approach include, but are not limited to providing a low latency power loss operation solution that prevents or limits data loss responsive to a power loss event. Since only memory access requests which for which an acknowledgement has been sent to the host are performed, host data is prevented from being only partially written to the memory device. In addition, since the power loss event can be detected preemptively, and the power loss operations can be performed before all power is lost, a secondary power supply for the memory sub-system is not needed which reduces complexity, size, and cost of the memory sub-system.

Figure 1:
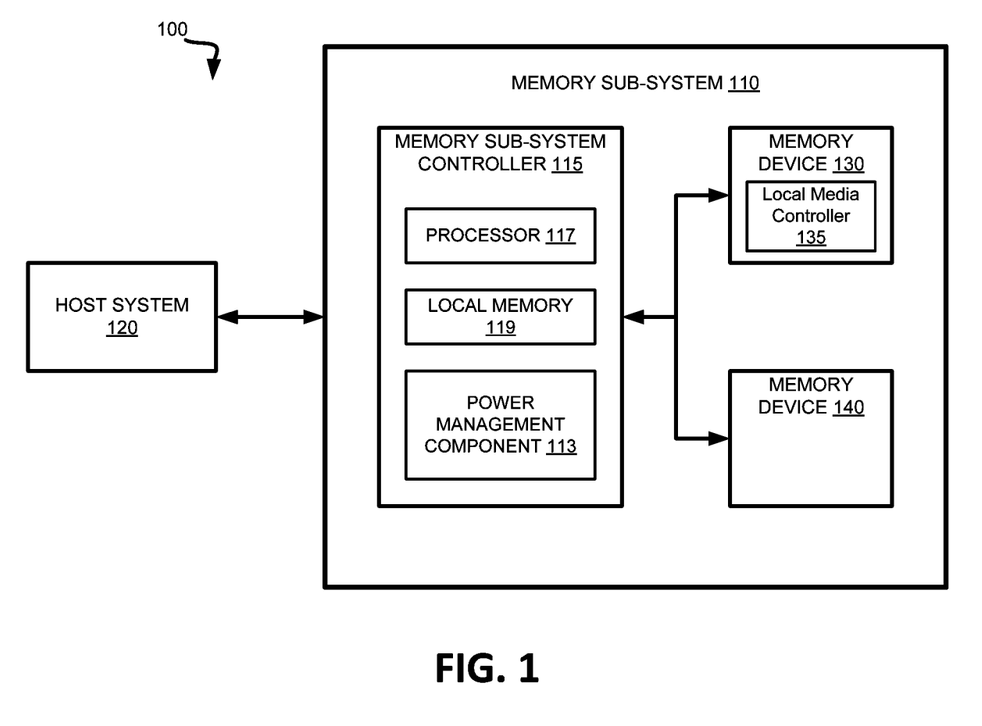
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130,140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In one embodiment, the memory sub-system 110 includes a power management component 113 that monitors the power supply level in memory sub-system 110. In some embodiments, the memory sub-system controller 115 includes at least a portion of power management component 113. For example, the memory sub-system controller 115 can include a processor 117 (e.g., a processing device) configured to execute instructions stored in local memory 119 for performing the operations described herein. In other embodiments, power management component 113 is part of memory sub-system 110, but is separate from memory sub-system controller 115. In other embodiments, local media controller 135 includes at least a portion of power management component 113 and is configured to perform the functionality described herein.

In one embodiment, power management component 113 continually or periodically measures a power supply level (e.g., a voltage supply level) of one or more components in memory sub-system 110. For example, power management component 113 can monitor the power supply level of the physical host interface (e.g., PCIe bus) connected to host system 120, the power supply level of memory sub-system controller 115, the power supply level of memory device 130, and/or some other power supply level. Power management component 113 can compare those power supply levels to a threshold level. If any one more of the monitored power supply levels drops below the threshold level, power management component 113 can determine that a threshold criterion is satisfied. Responsive to the threshold criterion being satisfied, power management component 113 can suspend local media controller 135. In one embodiment, power management component 113 can issue a suspend command to local media controller 135 which causes local media controller 135 to suspend its operation. In embodiments, where power management component 113 is separate from memory sub-system controller 115, responsive to the threshold criterion being satisfied, power management component 113 can send a signal (e.g., an interrupt signal) to memory sub-system controller 115 causing memory sub-system controller 115 to issue the suspend command to local media controller 135. Further details with regards to suspending the local media controller 135 are described below.

Figure 2:
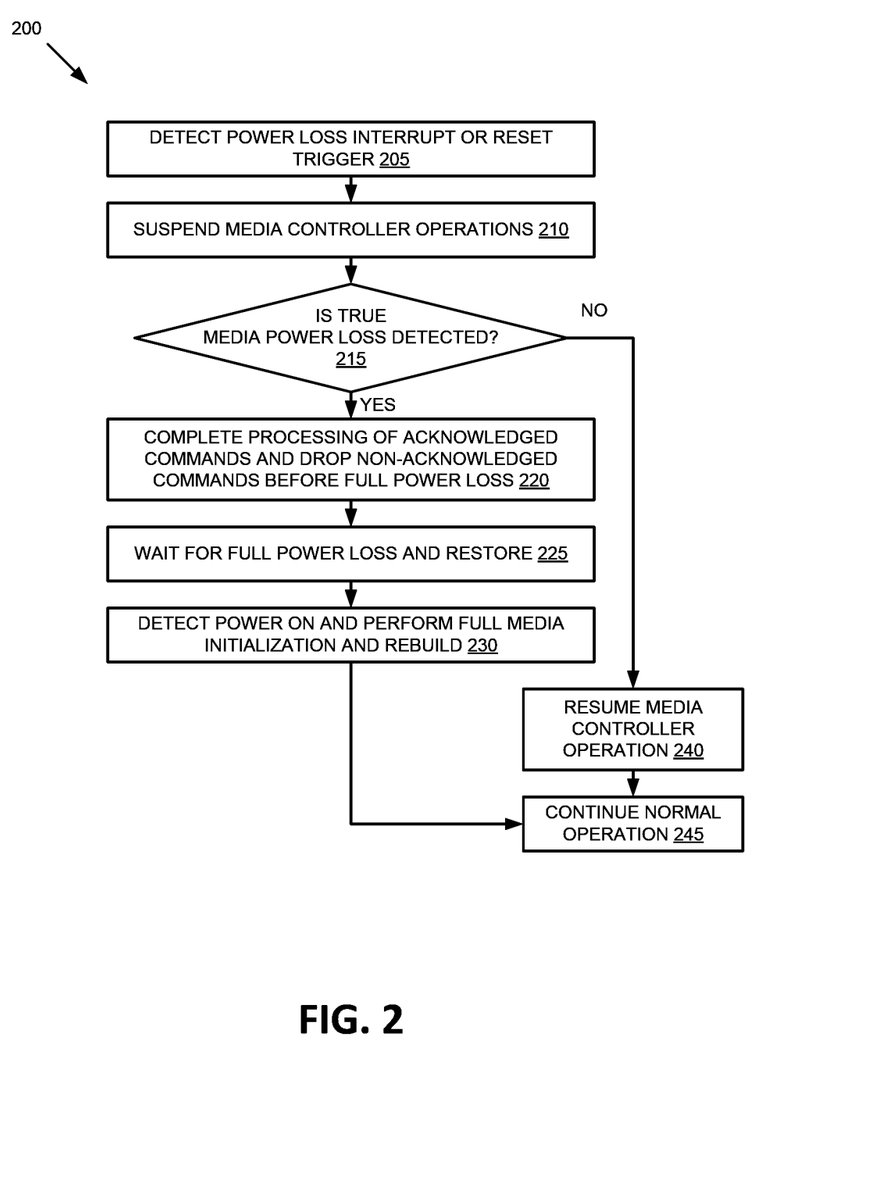
FIG. 2 is a flow diagram of an example method of minimizing power loss and reset time with media controller suspend for a memory device in a memory sub-system in accordance with some embodiments of the present disclosure.

FIG. 2 is a flow diagram of an example method of minimizing power loss and reset time with media controller suspend for a memory device in a memory sub-system in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by power management component 113 and memory sub-system controller 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 205, the processing logic detects a power loss interrupt or reset trigger in the memory sub-system 110. In one embodiment, power management component 113 continually or periodically measures a power supply level (e.g., a voltage supply level) of one or more components in memory sub-system 110. For example, power management component 113 can monitor the power supply level of the physical host interface (e.g., PCIe bus) connected to host system 120, the power supply level of memory sub-system controller 115, the power supply level of memory device 130, and/or some other power supply level. Power management component 113 can compare those power supply levels to a threshold level. If any one more of the monitored power supply levels drops below the threshold level, power management component 113 can determine that a threshold criterion is satisfied. In one embodiment, the threshold level is set at a fixed value, such as a certain percentage of the expected power supply level. In other embodiments, the threshold level is a variable level that adjusts according to operation conditions in the memory sub-system 110. The threshold criterion being satisfied is indicative of a power loss or reset in the memory sub-system 110 and since this determination is made before actual power loss, can be referred to as a preemptive power loss condition. In one embodiment, power management component 113 generates an interrupt, such as a power supply interrupt signal, that is received by memory sub-system controller 115. In another embodiment, memory sub-system controller 115 receives a reset trigger signal (e.g., from host system 120) indicating that the memory sub-system 110 will imminently be reset.

Responsive to detecting the power loss or reset, at operation 210, the processing logic suspends operations of local media controller 135 of memory device 130. In one embodiment, power management component 113 or memory sub-system controller 115 can issue a suspend command to local media controller 135 which causes local media controller 135 to enter a suspend state. In the suspend state, new memory access commands are blocked, while certain pending memory access operations are completed. In one embodiment, local media controller 135 can complete any memory access operations that have already been acknowledged and drop any other pending memory access operations.

At operation 215, the processing logic determines whether true media power loss is detected. As described above, a drop in any of a number of different power supply levels can trigger the power loss detection at operation 205. In one embodiment, if the drop in power supply level was associated with the power supply level of memory device 130, then a true media power loss is detected. A drop in other power supply levels, such as in the power supply level of the physical host interface (e.g., PCIe bus) connected to host system 120, the power supply level of memory sub-system controller 115, and/or some other power supply level, would not be considered a true media power loss condition. Thus, in one embodiment, power management component 113 identifies the source of the drop in the power supply level and correspondingly, if the drop in power supply level was associated with memory device 130, determine that true media power loss is detected.

Figure 3:
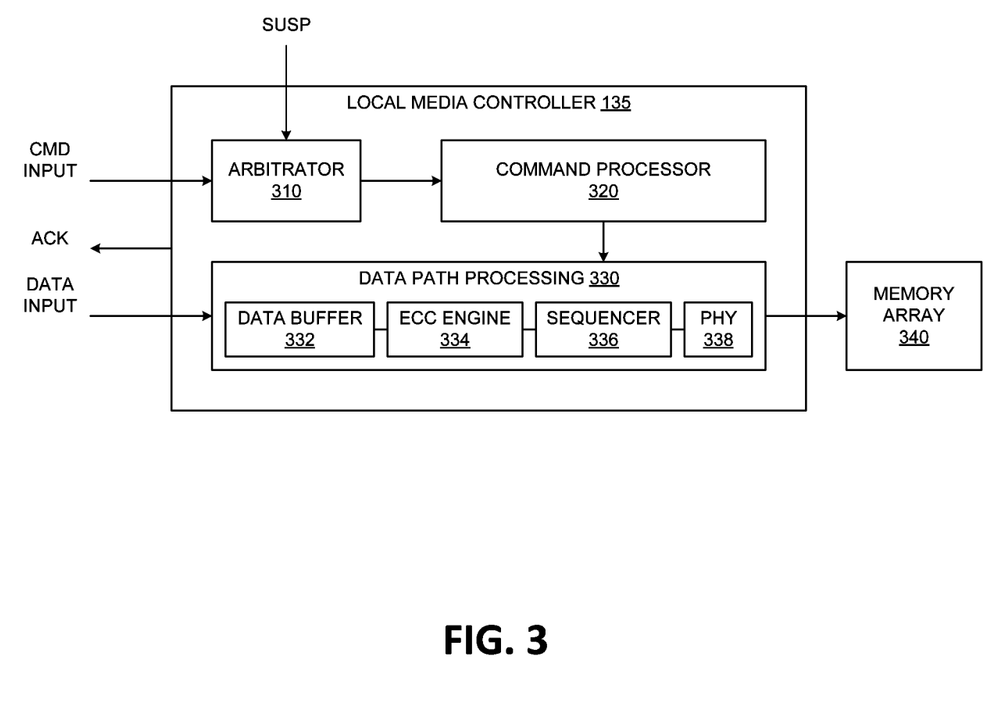
FIG. 3 is a block diagram illustrating a local media controller which can be suspended in accordance with some embodiments of the present disclosure.

If a true media power loss is detected, at operation 220, the processing logic initiates power loss handling operations. In one embodiment, the local media controller 135 is configured to, responsive to being suspended, complete processing of acknowledged memory access commands and drop non-acknowledged commands before full power loss at the memory device 130. FIG. 3 is a block diagram illustrating a local media controller 135 which can be suspended in accordance with some embodiments of the present disclosure. As illustrated, in one embodiment, local media controller 135 includes arbitrator 310, command processor 320, and data path processing component 330, which includes data buffer 332, error correcting code (ECC) engine 334, sequencer 336, and physical (PHY) interface 338. In one embodiment, arbitrator 310 receives memory access commands (i.e., command (CMD) input) from a requestor, such as memory sub-system controller 115 or host system 120, and passes them to command processor 320. Command processor 320 can perform various operations, such as logical to physical address translation, drift management, etc. Together, the arbitrator 310 and command processor 320 can be referred to as the "command path processing component." Once command processing is complete, an indication of the command (i.e., the corresponding memory access operation) is passed to data path processing component 330. After receiving the indication of the command, data path processing component 330 can receive the corresponding data (i.e., data input) from the requestor. For example, a direct memory access (DMA) operation can be performed to store the corresponding data in data buffer 332. Upon receipt of the corresponding data, local media controller 135 can provide a first acknowledgment (ACK) signal to the requestor. The received data is further processed by ECC engine 334 to correct any errors and sequencer 336 to re-order the data if necessary, and written to memory array 340 via physical interface 338.

In one embodiment, as described above, local media controller 135 can receive a suspend command (SUSP) from memory sub-system controller 115. The suspend command causes local media controller 135 to enter a suspend state. In the suspend state, new memory access commands are blocked (i.e., nothing new is received at the command input), while certain pending memory access operations are completed. In one embodiment, local media controller 135 can complete any memory access operations for which an acknowledgement signal has been sent to the requestor and drop any other pending memory access operations. For example, any memory access operations for which the corresponding data has been received (e.g., at the data input) and is currently being processed by any of the components of data path processing 330 can be completed (i.e., passed all through data path processing 330 and committed to memory array 340). Conversely, any memory access operations for which an acknowledgment signal has not been sent, including those being processed by arbitrator 310 or command processor 320 are dropped and can be re-submitted after power is restored.

By processing only those memory access operations that are in data path processing 330, the time associated with the power loss handling is minimized. Since local media controller 135 receives the command in response to the detection of imminent power loss, there is limited time available to perform the power loss handling, so any reduction can be beneficial. To process any received command, including those at arbitrator 310 and command processor 320 would increase the power loss handling time, likely beyond the time available until power loss. To drop commands for which an acknowledgment has already been sent to the requestor could result in data loss, as the requestor expects such commands to be fully processed and for the corresponding data to be committed to memory array 340.

Referring again to FIG. 2, once the power loss handling has been completed, at operation 225, the processing logic waits for full power loss and restore. At operation 230, the processing logic detects a power on event (i.e., the restoration of the power supply signal) in the memory sub-system 110 and performs a full media initialization and rebuild operation. In one embodiment, the full media initialization is performed as part of the power-on reset where the firmware will set up the media controller hardware and the 3D cross-point media registers to ensure that the memory sub-system controller can communicate (e.g., write/read) with the media properly. In one embodiment, the rebuild operation can include power-on ungraceful shutdown handling. The rebuild operation essentially reconciles the movement of the last few management units which might have happened before the power loss. The host IO does not necessarily change the mapping of the logical to physical mapping unit, and only the movements of management units from a used list to a spare list or to a defect list will be reconciled during the ungraceful shutdown handling. At operation 245, the local media controller 135 can continue normal operation after the power-on process (e.g., full media initialization and rebuild operations) have completed successfully.

In the event that at operation 215, true media power loss is not detected, processing proceeds to operation 240, where media controller operation is resumed. In one embodiment, the local media controller 135 is unsuspended and continues processing memory access commands both from command processor 320 and data path processing 330.

Figure 4:
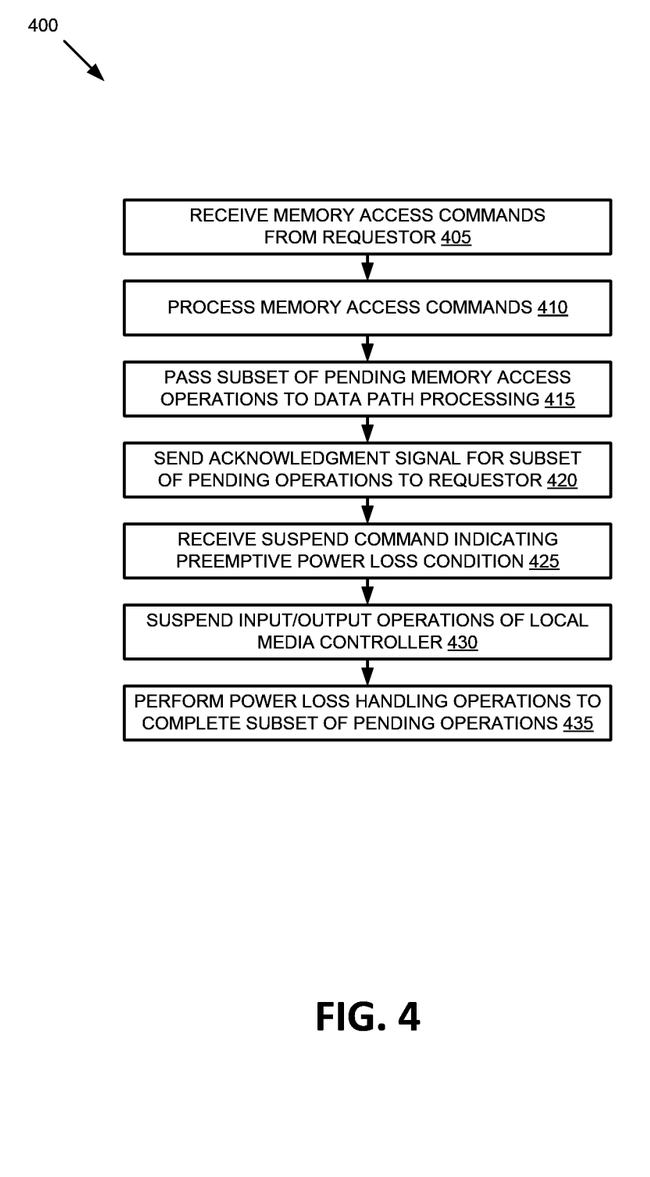
FIG. 4 is a flow diagram of an example method of operation of a local media controller associated with a memory device in a memory sub-system in accordance with some embodiments of the present disclosure.

FIG. 4 is a flow diagram of an example method of operation of a local media controller associated with a memory device in a memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by local media controller 135 of FIG. 1 and FIG. 3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic receives memory access commands from the requestor, such as memory sub-system controller 115. In one embodiment, the memory access commands initiate corresponding memory access operations. For example, the memory access commands could be program commands, read commands, or erase commands, and can initiate corresponding program operations, read operations, or erase operations. In one embodiment, the memory access commands are received at an arbitrator 310 of the local media controller 135.

At operation 410, the processing logic processes the memory access commands. In one embodiment, arbitrator 310 pass the memory access commands to command processor 310 in the command path processing component of local media controller 135. Command processor 320 can perform various operations pertaining to the memory access commands, such as logical to physical address translation, drift management, etc. At operation 415, the processing logic passes the subset of the pending memory access operations to data path processing component 330. Once command processing is complete, an indication of the memory access commands (i.e., the corresponding memory access operations) is passed to data path processing component 330. In one embodiment, data path processing component 330 includes data buffer 332, error correcting code (ECC) engine 334, sequencer 336, and physical (PHY) interface 338.

At operation 420, the processing logic sends an acknowledgment signal for the subset of the pending memory access operations to the requestor. In one embodiment, after receiving the indication of the commands, data path processing component 330 can receive the corresponding data (i.e., data input) from the requestor. For example, a direct memory access (DMA) operation can be performed to store the corresponding data in data buffer 332. Upon receipt of the corresponding data, local media controller 135 can provide a first acknowledgment (ACK) signal to the requestor. The acknowledgement signal indicates that the data has been received and serves as a confirmation that the associated memory access operation will be completed by local media controller 135.

At operation 425, the processing logic receives a suspend command indicating a preemptive power loss condition in the memory sub-system 115. In one embodiment, local media controller 135 can receive a suspend command (SUSP) from memory sub-system controller 115. At operation 430, responsive to receiving the suspend command, the processing logic suspends input/output operations of the local media controller 135. In one embodiment, the suspend command causes local media controller 135 to enter a suspend state. In the suspend state, new memory access commands are blocked (i.e., nothing new is received at the command input), while certain pending memory access operations are completed.

At operation 435, the processing logic performs power loss handling operations to complete a subset of the pending memory access operations. In one embodiment, local media controller 135 can complete any memory access operations for which an acknowledgement signal has been sent to the requestor and drop any other pending memory access operations. For example, any memory access operations for which the corresponding data has been received (e.g., at the data input) and is currently being processed by any of the components of data path processing 330 can be completed (i.e., passed all through data path processing 330 and committed to memory array 340). Conversely, any memory access operations for which an acknowledgment signal has not been sent (i.e., a remainder of the pending memory access operations), including those being processed by arbitrator 310 or command processor 320 are dropped and can be re-submitted after power is restored.

Figure 5:
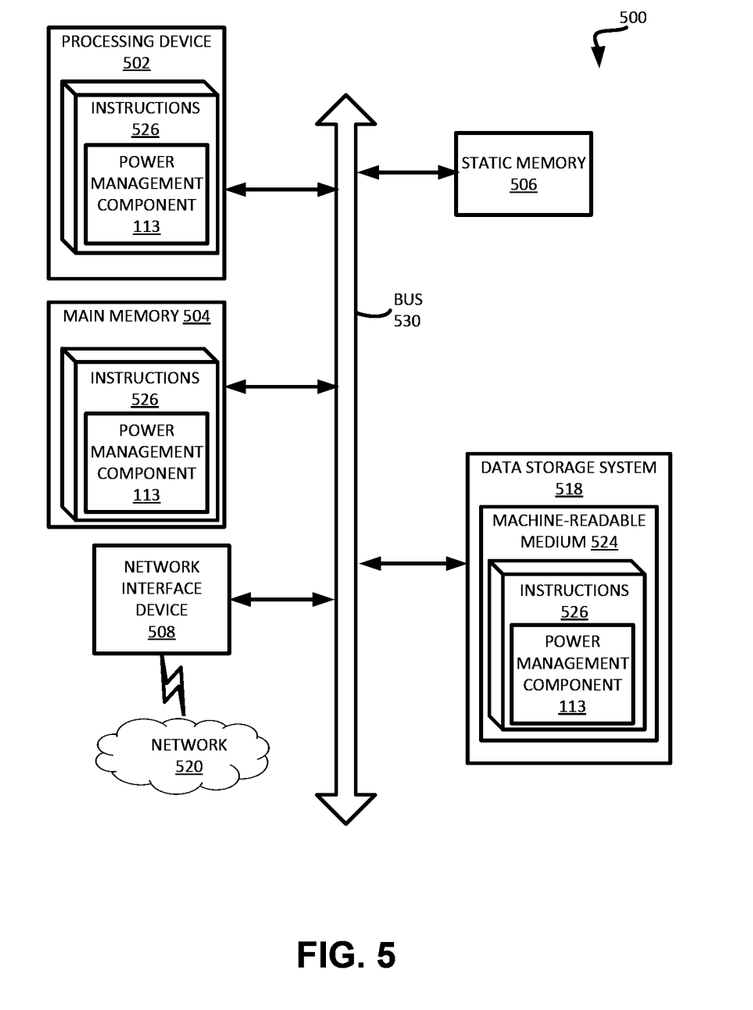
FIG. 5 is a block diagram of an example computer system in which embodiments of the present disclosure can operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to power management component 113, memory sub-system controller 115, or local media controller 135 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to power management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
   detecting, by a memory sub-system controller in a memory sub-system, a preemptive power loss condition in the memory sub-system;
   responsive to detecting the preemptive power loss condition, sending a suspend command to a local media controller associated with a memory device to cause input/output operations of the local media controller to be suspended, wherein the local media controller comprises a command path processing component and a data path processing component, wherein responsive to being suspended, the local media controller to perform power loss handling operations to complete a subset of a plurality of pending memory access operations from the data path processing component for which an acknowledgment signal has been sent to a requestor and to drop, from the command path processing component, a remainder of the plurality of the pending memory access operations for which an acknowledgement signal has not been sent to the requestor;
   detecting a full power loss and restore condition in the memory sub-system; and
   responsive to detecting the full power loss and restore condition, initializing the memory device and causing operations of the local media controller to resume.

2. The method of claim 1, wherein detecting the preemptive power loss condition in the memory sub-system comprises:
   monitoring a plurality of power supply levels in the memory sub-system; and
   determining that at least one of the plurality of power supply levels satisfies a threshold criterion.

3. The method of claim 1, wherein detecting the preemptive power loss condition in the memory sub-system comprises:
   receiving a power supply interrupt signal indicating that a power supply level in the memory sub-system has dropped below a threshold level.

4. The method of claim 1, further comprising:
   determining whether the preemptive power loss condition comprises true media power loss for the memory device; and
   responsive to the preemptive power loss condition not comprising true media power loss for the memory device, causing the local media controller to resume normal operation.

5. The method of claim 1, wherein the memory device comprises a cross-point array of non-volatile memory cells.

6. A memory sub-system comprising:
   a memory device comprising a local media controller, wherein the local media controller comprises a command path processing component and a data path processing component; and
   a memory sub-system controller, operatively coupled with the memory device, to perform operations comprising:
      detecting a preemptive power loss condition in the memory sub-system;
      responsive to detecting the preemptive power loss condition, sending a suspend command to the local media controller to cause input/output operations of the local media controller to be suspended, wherein responsive to being suspended, the local media controller to perform power loss handling operations to complete a subset of a plurality of pending memory access operations from the data path processing component for which an acknowledgment signal has been sent to a requestor and to drop, from the command path processing component, a remainder of the plurality of the pending memory access operations for which an acknowledgement signal has not been sent to the requestor;
      detecting a full power loss and restore condition in the memory sub-system; and
      responsive to detecting the full power loss and restore condition, initializing the memory device and causing operations of the local media controller to resume.

7. The memory sub-system of claim 6, wherein detecting the preemptive power loss condition in the memory sub-system comprises:
   monitoring a plurality of power supply levels in the memory sub-system; and
   determining that at least one of the plurality of power supply levels satisfies a threshold criterion.

8. The memory sub-system of claim 6, wherein detecting the preemptive power loss condition in the memory sub-system comprises:
   receiving a power supply interrupt signal indicating that a power supply level in the memory sub-system has dropped below a threshold level.

9. The memory sub-system of claim 6, wherein the processing device to perform operations further comprising:
determining whether the preemptive power loss condition comprises true media power loss for the memory device; and
responsive to the preemptive power loss condition not comprising true media power loss for the memory device, causing the local media controller to resume normal operation.

10. The memory sub-system of claim 6, wherein the memory device comprises a cross-point array of non-volatile memory cells.

11. A method of operation of a local media controller associated with a memory device in a memory sub-system, the method comprising:
receiving, by the local media controller and from a memory sub-system controller, a suspend command indicating a preemptive power loss condition in the memory sub-system;
responsive to receiving the suspend command, suspending input/output operations of the local media controller, wherein the local media controller comprises a command path processing component and a data path processing component; and
performing power loss handling operations to complete a subset of a plurality of pending memory access operations, wherein performing the power loss handling operations comprises completing a subset of the plurality of pending memory access operations from the data path processing component for which an acknowledgment signal has been sent to a requestor and dropping a remainder of the plurality of the pending memory access operations for which an acknowledgement signal has not been sent to the requestor from the command path processing component.

12. The method of claim 11, further comprising:
receiving, at an arbitrator of the local media controller, a plurality of memory access commands from the requestor, the plurality of memory access commands corresponding to the plurality of pending memory access operations;
processing, by a command processor of the local media controller, the plurality of memory access commands;
passing the subset of the plurality of pending memory access operations to a data path processing component of the local media controller; and
sending the acknowledgement signal for the subset of the plurality of pending memory access operations to the requestor.

13. The method of claim 11, wherein the preemptive power loss condition indicates that at least one of the plurality of power supply levels in the memory sub-system satisfies a threshold criterion.

14. The method of claim 11, wherein the memory device comprises a cross-point array of non-volatile memory cells.

* * * * *